Patented July 30, 1935

2,009,611

UNITED STATES PATENT OFFICE 2,009,611

YELLOW AZO-DYESTUFF CAPABLE OF BEING CHROMED

Erich Fischer, Bad Soden-on-the-Taunus, and Walter Gmelin, Frankfort-on-the-Main, Germany, assignors to General Aniline Works, Inc., New York, N. Y., a corporation of Delaware No Drawing. Application February 19, 1935, Serial No. 7,298. In Germany October 27, 1933

4 Claims. (Cl. 260—87)

The present invention relates to yellow azo-dyestuffs capable of being chromed; more particularly it relates to dyestuffs of the following general formula:

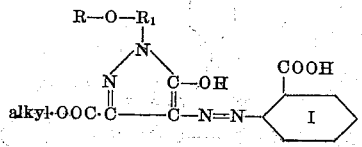

wherein R and R₁ mean radicals of the benzene or naphthalene series at least one of which contains at least one sulfonic acid group and the benzene nucleus I may be further substituted.

We have found that valuable yellow azo-dyestuffs capable of being chromed may be obtained by combining the diazo-compounds of bases of the following general formula

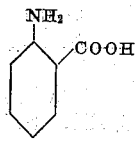

wherein the benzene nucleus may contain further substituents, with pyrazolone derivatives of the general formula:

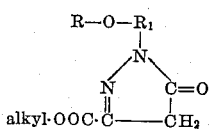

wherein R and R₁ stand for radicals of the benzene or naphthalene series, at least one of which contains at least one sulfonic acid group.

The new dyestuffs dye the animal fibre tints which, when after-chromed, are distinguished by good fastness properties.

The dyestuffs may also be used for preparing color lakes.

The following example serves to illustrate the invention, but it is not intended to limit it thereto; the parts are by weight:

137 parts of ortho-aminobenzoic acid are diazotized in the usual manner and combined with a solution, rendered alkaline by means of sodium carbonate, of 440 parts of a pyrazolone of the following constitution:

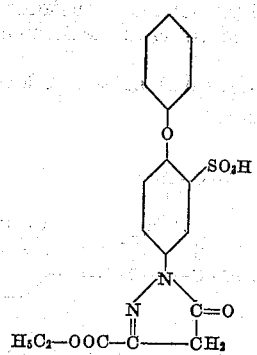

When the coupling is finished the dyestuff is worked up in the usual manner. It dyes wool reddish-yellow tints which, when after-chromed with, for instance, potassium bichromate and sulfuric acid, are distinguished by very good properties of fastness.

The coupling may also be conducted, for instance, in the presence of sodium bicarbonate or sodium acetate.

Instead of the diazo-component, mentioned in the foregoing example, there may also be used the diazo compounds of, for instance, the following bases:
4-sulfo-2-aminobenzene-1-carboxylic acid,
5-sulfo-2-aminobenzene-1-carboxylic acid,
4-chloro-2-aminobenzene-1-carboxylic acid,
3-chloro-2-aminobenzene-1-carboxylic acid,
3,5-dichloro-2-aminobenzene-1-carboxylic acid,
3-bromo-2-aminobenzene-1-carboxylic acid,
3-chloro-5-sulfonic acid-2-aminobenzene-1-carboxylic acid.
4-nitro-3-chloro-2-aminobenzene-1-carboxylic acid.

The pyrazolone, used in the above example, may be replaced by others, for instance, by 1-(4'-phenoxy-3'-sulphophenyl) - 5 - pyrazolone-3-carboxylic acid-methyl-ester,
1-(2'-phenoxy-5'-sulphophenyl)-5-pyrazolone-3-carboxylic acid-ethyl-ester,
1-(4'-phenoxy-2'-sulfophenyl) - 5 - pyrazolone-3-carboxylic acid-ethyl-ester,
1-(4''-chloro-2'-phenoxy-5'-sulfophenyl) - 5 -pyrazolone-3-carboxylic acid-methyl-ester,
1-(4''methyl-2-phnoxy- 5' -sulfphenyl) - 5 - pyrazolone-3-carboxylic acid-ethyl-ester,
1-(2''methyl-4'-phenoxy-3'-sulfophenyl) - 5 -pyrazolone-3-carboxylic acid-methyl-ester,
furthermore by a pyrazolone derivative of either of the following constitutions:

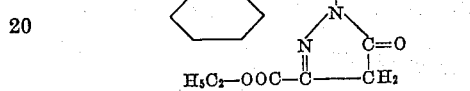

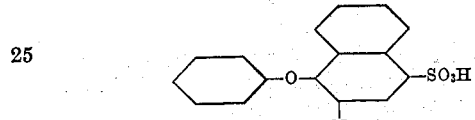

There are obtained azo-dyestuffs which possess the same good properties of fastness as the dyestuff obtained according to the foregoing example.

We claim:
1. The azo-dyestuffs of the following general formula:

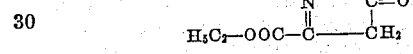

wherein R and R₁ mean radicals of the benzene or naphthalene series at least one of which contains at least one sulfonic acid group and the benzene nucleus I may be substituted by halogen, nitro or sulfonic acid groups, forming, when dry, yellow powders and yielding on animal fibers yellow dyeings which, when after-chromed, possess very good fastness properties.

2. The azo-dyestuff of the following formula:

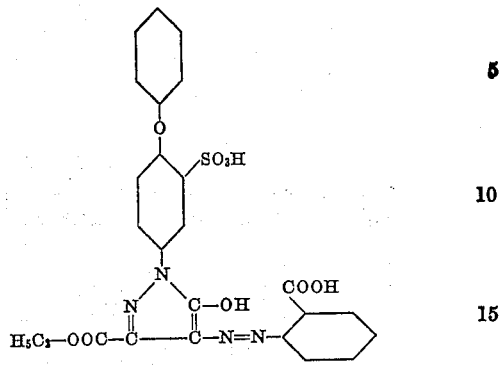

forming, when dry, a yellow powder and yielding on wool a reddish-yellow dyeing which, when after-chromed, possesses very good fastness properties.

3. The azo-dyestuff of the following formula:

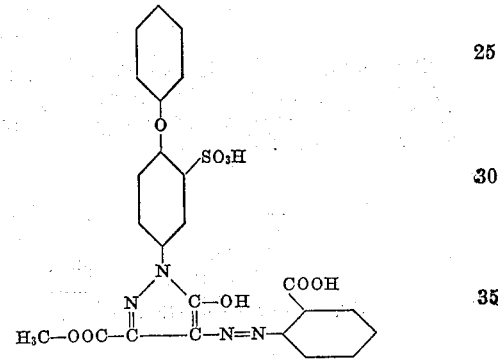

forming, when dry, a yellow powder and yielding on wool a yellow dyeing which, when after-chromed, possesses very good fastness properties.

4. The azo-dyestuff of the following formula:

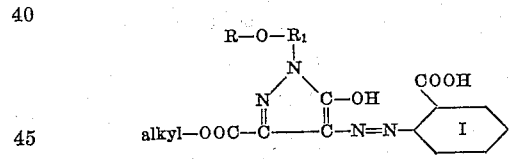

forming, when dry, a yellow powder and yielding on wool a yellow dyeing which, when after-chromed, possesses very good fastness properties.

ERICH FISCHER.
WALTER GMELIN.